W. S. HENRY.
CIRCUIT CONTROLLER.
APPLICATION FILED OCT. 23, 1912.
1,169,957.
Patented Feb. 1, 1916.
2 SHEETS—SHEET 2.
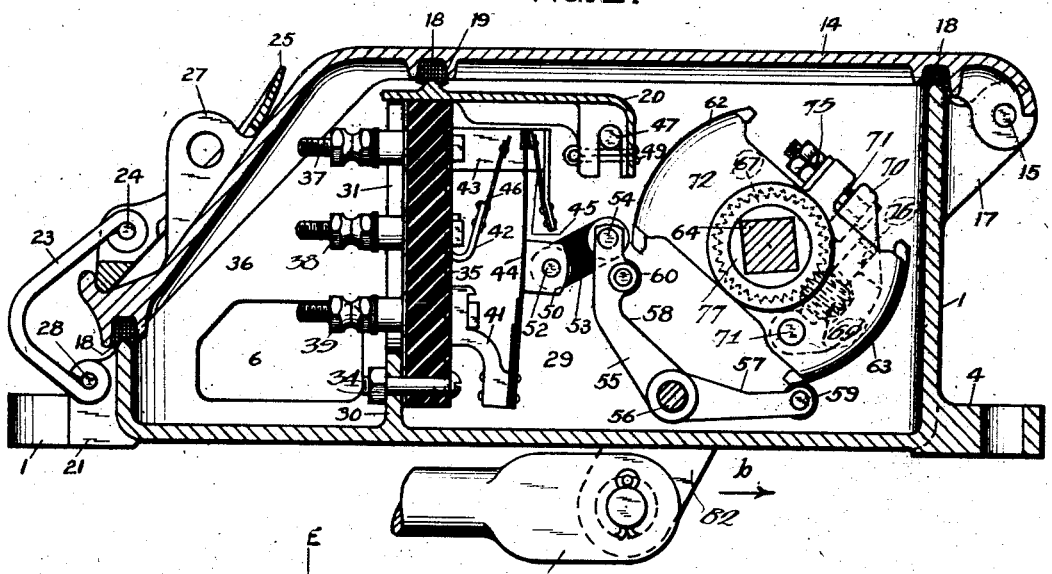
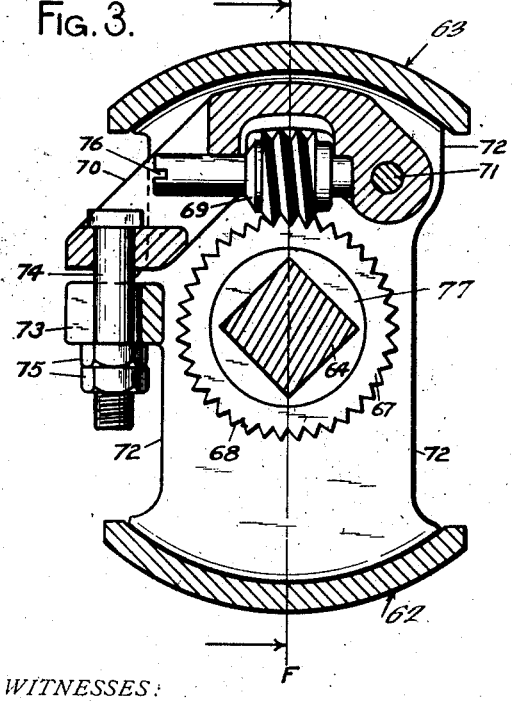
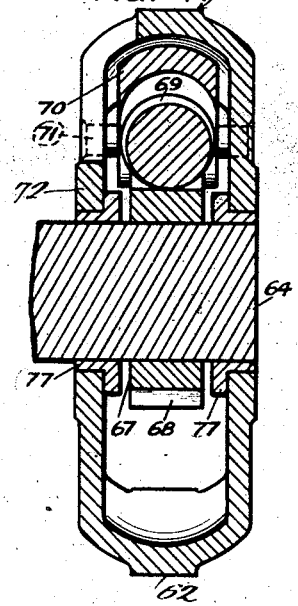
WITNESSES:
George T. Whitney
Sherman A. Benedict
INVENTOR.
William S. Henry,
BY Lyman E. Dodge
ATTORNEY.

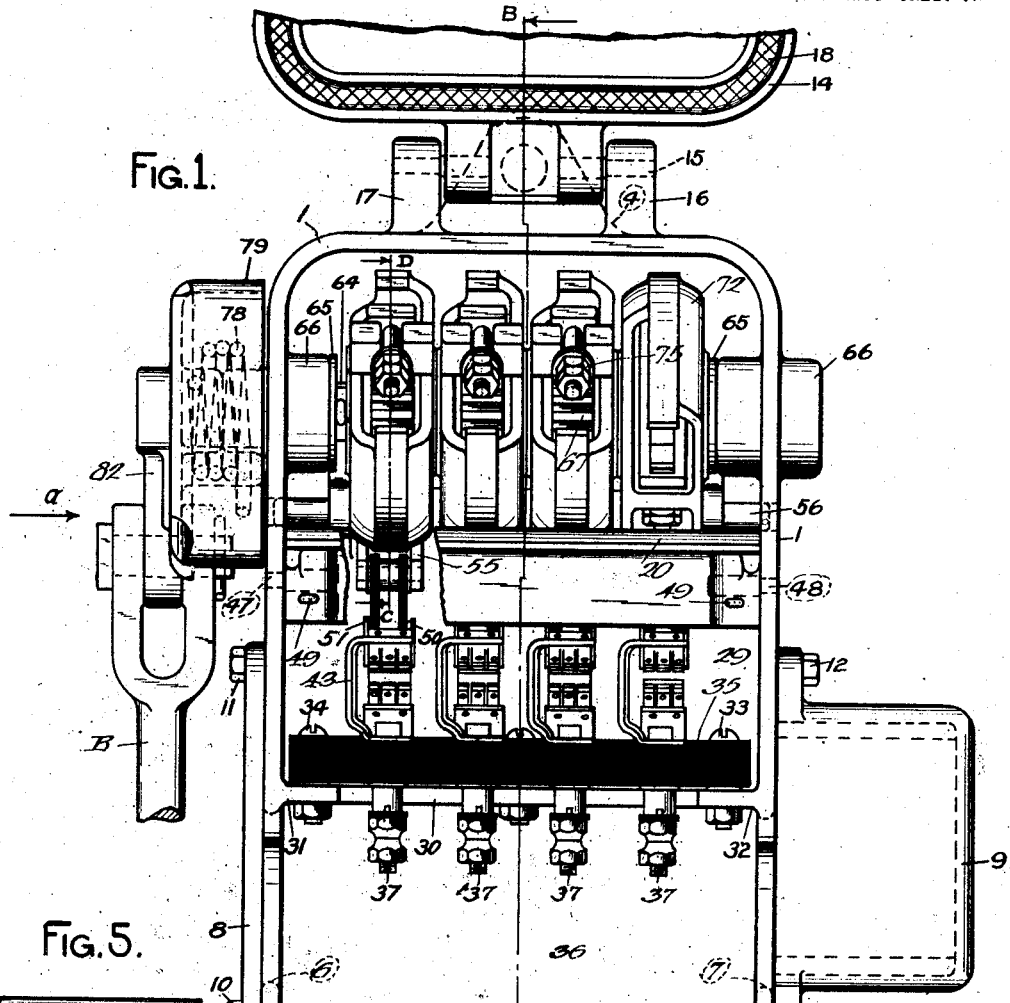

UNITED STATES PATENT OFFICE.

WILLIAM S. HENRY, OF ROCHESTER, NEW YORK, ASSIGNOR TO GENERAL RAILWAY SIGNAL COMPANY, OF GATES, NEW YORK, A CORPORATION OF NEW YORK.

CIRCUIT-CONTROLLER.

1,169,957.  Specification of Letters Patent.  Patented Feb. 1, 1916.

Application filed October 23, 1912. Serial No. 727,333.

*To all whom it may concern:*

Be it known that I, WILLIAM S. HENRY, a citizen of the United States, and a resident of the city of Rochester, in the county of Monroe and State of New York, have invented a new and useful Circuit-Controller, of which the following is a specification.

This invention relates to a circuit controller.

The primary object of this invention is to provide a circuit controller, which will be positive in action both in opening and closing circuits; easily, positively, and accurately adjustable; and so inclosed and protected that it may be used safely on outside work.

Other objects and advantages will appear as the description of the invention progresses, and the novel features of the invention will be particularly pointed out in the appended claims.

In describing the invention in detail, reference is had to the accompanying drawings wherein I have illustrated a preferred physical embodiment of my invention, and wherein like characters of reference designate corresponding parts throughout the several views, and in which:—

Figure 1 is a plan view of a device embodying my invention; Fig. 2, is a longitudinal cross-sectional view upon the line A—B of Fig. 1 looking in the direction of the arrows; Fig. 3, is a cross-sectional view of a part on the line C—D of Fig. 1, looking in the direction of the arrows; Fig. 4, is a cross-sectional view upon the line E—F of Fig. 3, looking in the direction of the arrows; Fig. 5, is a side elevational view of a fragment of Fig. 1, looked at in the direction of the arrow *a*.

Referring to Figs. 1 and 2; 1, designates a casing open at the top and having apertured lugs 2, 3 and 4 by means of which the casing is attached firmly to a support or standard. Both sides of the casing 1, have holes therethrough at 6 and 7, through which wires of the various circuits to be controlled may be led. As it cannot always be known beforehand through which side of the casing it will be most convenient to pass the wires, a plate 8 and a conduit cap 9 are supplied, either of which is adapted to be fastened by means of bolts 10, 11, 12 and 13 to either side of the casing. If the wires are brought in from the right hand side the conduit cap will be fastened to the right hand side as shown, and the plate 8 will be fastened to the left hand side, but if the wires are brought in from the left hand side the plate 8 and conduit cap 9 would be interchanged. Of course it is obvious that the wires may be brought in from both sides of the casing.

A cover 14 is provided for closing the top opening of the casing. The cover is pivoted by means of a pin 15 which is journaled in the lugs 16 and 17 outstanding from the casing 1 at its rear end. A packing or gasket 18 is placed in a groove which extends completely around the cover, so situated that when the cover is placed in closed position the gasket 18 rests upon the upper edge of the casing 1. A groove 19 is also formed transversely of the cover and is so situated that the gasket 18 therein rests upon a contact cover 20 which fits nicely against both sides of the casing 1 and extends transversely therebetween.

A pin 28 supported by lugs 21 and 22 is provided for fastening the hasp link 23 to the casing. The other end of the hasp link 23 is curved about a pin 24 which is fastened in a hasp 25. The hasp 25 has a longitudinal slot 26 therein which is provided to receive the apertured lug 27 which is either cast integral with the cover 14 or fastened rigidly thereto.

By placing the cover in the closed position as shown in Fig. 2, and then swinging the hasp into the position as shown in Fig. 2, considerable pressure is exerted by the hasp to force the cover down tightly upon the casing thereby compressing the gasket 18 and forming a water-tight joint entirely around the top edge of the casing and also along the cover plate 20 so that chamber 29 is protected against the entrance of water either at the junction between the cover and the top edge of the casing or between the cover and the top edge of cover plate 20. By inserting a padlock into the hole in apertured lug 27, the cover may be locked in the closed position.

The casing 1 has a rib 30 rising from the bottom thereof and ribs 31 and 32 projecting from the sides thereof. These ribs have holes therethrough to receive the bolts 33 and 34 by means of which the contact panel 35 made of any suitable insulating material, is firmly attached thereto. The contact panel 35 by means of the bolts 33 and 34 is drawn so tightly against the ribs 30, 31 and 32 that for all practical purposes a watertight joint is formed, thus completing the isolation of chamber 29 from the influence of outside moisture.

The construction as above described provides a watertight chamber as 29, and a chamber 36 which is almost watertight depending upon the tightness of the joint between the conduit cap 9 and any conduit to which it is connected. It is, however, of no serious moment if water or moisture should enter the chamber 36, for the wires which enter the chamber 36 through the holes 6 or 7 are firmly and permanently connected to the binding posts 37, 38, and 39, and little or no damage would be caused by slight corrosion due to moisture. Chamber 29 has, however, been made thoroughly water-tight because the movable contacts of applicant's circuit controller are located therein, as will be later described, because as is well known to those skilled in the art all contacts, which are made or broken at intervals, must be retained in a bright untarnished and electrically conducting condition.

As before stated the contact panel 35 bears the binding posts 37, 38, and 39. Each of these binding posts include a bolt which extends through the contact panel and holds the brackets 41, 42 and 43 respectively tightly against the contact panel and also makes electrical connection with such brackets, thus serving as a means to conduct electricity from one side of the panel, that is, the side exposed to the chamber 36, to the other side of the panel, that is the side exposed to the chamber 29, and at the same time to offer no opportunity for water or moisture to pass from one chamber to the other.

The bracket 41 bears the resilient contact arm 44 which may be, by means hereinafter described, moved from contact with the contact spring 45 supported by bracket 43 into contact with the contact spring 46 supported by bracket 42. When speaking of the contact springs 45 and 46 hereinafter, I shall refer to contact spring 45 as the normal contact and to contact spring 46 as the reverse contact.

Although applicant's construction prevents the entrance of moisture or water into the chamber 29 it does not prevent the condensation of moisture upon the under side of the cover 14. Heretofore such condensed moisture forming upon the under side of cover 14 has been the source of considerable annoyance, because after condensing it forms drops which fall upon the contact springs 44, 45 and 46, cause them to tarnish and so destroy their power of conducting electricity or at least greatly increase the resistance at the points of contact. Applicant has in his construction provided a remedy for such difficulty in the cover plate 20. This cover plate is pivoted on the pins 47 and 48, which are fastened to the opposite sides of the casing 1. The cover plate 20 is prevented from becoming displaced by means of the cotter pins 49. The cover plate 20 extends over all of the contact springs when in the position as shown in Fig. 2, consequently any moisture which may collect upon the under side of cover 14 and then drop, is prevented from falling upon the contacts 44, 45 and 46, furthermore, the changes in temperature outside of the casing 1, will not cause a condensation of moisture upon the under side of cover plate 20, by reason of the fact that there is a body of air between the cover plate 20 and the underside of the cover 14.

The contact arm 44 has outstanding lugs 50 and 51 in which a pin 52 is journaled. This pin 52 forms a means for connecting link 53 made of any suitable insulating material, preferably mica, with the contact arm 44. The other end of the insulating link 53 is connected by means of pins 54 to the rocker 55. Rocker 55 is pivoted upon a rod 56 which extends transversely of the case 1 and is supported by the sides thereof. It has two arms 57 and 58 in each of which is journaled a roller as 59 and 60. The rollers 59 and 60 are so situated that they lie in the path of movement of a cam shell designated generally by 72. This cam shell has two separate faces as 62 and 63 so situated and spaced that when one cam face starts to contact with roller 59, the other cam face is just moving out of contact with roller 60 whereby contact arm 44 is always under positive control. When referring to rocker 55 hereinafter, the position as shown in Fig. 2 will be designated as the normal position.

A square shaft 64 extends transversely of the case and on either end has bushings 65, which have a circular outer periphery whereby the shaft is journaled in the bearings 66, formed in the sides of the casing 1. This shaft bears at intervals the drivers 67 which have teeth 68 cut about their entire periphery. The teeth of the driver 67 engage with the worm wheel 69 which is journaled in the clamp 70, which clamp 70 is pivoted upon the pin 71. The pin 71 is supported by the walls of the cam shell 72. An apertured end of the clamp 70 extends over and in alinement with an apertured lug 73 upon the cam shell 72. A bolt 74 is passed through the apertures of the lug 73 and the end of clamp 70, so that by means of the nuts 75, the clamp 70 may be held firmly in a given position relative to lug 73, and as worm wheel 69 is journaled in clamp 70 and bears against driver 67 it may be clamped so firmly against driver 67 that it cannot be turned by means of a screw driver inserted in the slot 76, and as driver 67 can not turn relatively to shaft 64, and cam shell 72 cannot move without a corresponding movement of worm wheel 69, the cam shell 72 may be firmly held in position. In order to allow the cam shell 72 to rotate relative to the shaft 64, when desired, bushings 77 have been placed upon the shaft 64 and the cam shell 72 has been made to bear upon their outer circular periphery.

The normal position of shaft 64 would, if cam shell 72 were rigidly attached thereto, determine the exact position of the cam faces 62 and 63, but as different conditions require different operations of a circuit controller it is necessary to provide an adjustment between the shaft 64 and the cam shell 72. This adjustment is found in the parts just described in connection with the driver 67, the worm wheel 69, the clamp 70 and the bolt 74. If the position of cam shell 72 for the particular situation is not as it should be, then in order to adjust it, it is merely necessary to loosen nuts 75, thereby loosening clamp 70, which allows worm wheel 69 to be freely turned by means of a screw driver inserted in slot 76. As driver 67 cannot rotate about shaft 64 a turning of wheel 69 will cause a rotation of cam shell 72 about the axis of shaft 64. When the desired position of the cam surfaces 62 and 63 has been reached the nuts 75 are tightened thereby causing clamp 70 to clamp wheel 69 tightly against driver 67 so that all parts will remain permanently in the adjusted position. This method of adjustment, it should be observed, is extremely precise, so that a very minute change in the position of cam surfaces 62 and 63 may be readily made, by reason of the large size of worm wheel 69 and driver 67, and at the same time it is very strong and substantial. The connection between the driver 67 and the cam shell 72 is such that the cam shell 72 will be forced to move with the driver 67 even if after making an adjustment by loosening nuts 75, the person so doing neglects to tighten said nuts.

The construction of the means for adjusting the cam shell 72 relatively to the shaft 64 is shown, described and claimed in my co-pending application, Serial No. 875,034, filed December 1st, 1914, which is a division of this application.

The external means for moving the shaft 64 and so all of the operated parts inside of the casing is the crank arm 82, which is pinned to the shaft 64 outside of the casing so that a movement of the arm 82 by any suitable means causes a movement of the circuit controllers within the casing.

Because of reasons which will be later explained it is sometimes desirable to cause the crank arm 82 to assume a vertical position, when the means connecting it with the operating means become broken or disconnected. Applicant's means for causing the crank arm to assume the vertical position in case of a broken connection, are the spiral spring 78 wrapped about the journal of the shaft 64 and protected by the hood 79, together with the pin 80 firmly attached to the casing 1 and the pin 81 firmly attached to the crank arm 82. The ends of the spring 78 extend downwardly so that they are both in the path of movement of the pin 81 and consequently are in operative relation with the pin 80 which lies above pin 81. If while the crank arm 82 is in the position as shown in Fig. 5, the connection from it to the moving means were broken, then the spring 78 would, by action upon pin 81, bring it to the vertical position in line with pin 80.

With all of the parts in the position as shown in Fig. 2, the arm 44 makes contact with contact spring 45. If the arm B is moved toward the reverse position, that is in the direction of the arrow $b$, then upon a very slight movement of arm 82, the cam face 63 will move out of contact with roller 59 and cam face 62 will move into contact with roller 60 thus forcing contact arm 44 into contact with contact spring 46. The extent of movement of arm 82 before cam surface 63 releases roller 59 may be made anything desired, that is, upon the slightest movement of arm 82 cam face 63 can be made to disengage roller 59 or by suitably adjusting cam shell 72 the extent necessary in arm 82 before cam face 63 disengages roller 59 may be made very great. In fact by moving cam shell 72 to a very considerable angle, the cam face 63 may be made to bear in its normal position against roller 60, thus causing contact arm 44 to normally make contact with contact spring 46, so that, upon a movement of arm 82 in the direction of arrow $b$ the contact arm 44 would be moved positively into engagement with the contact spring 45 and the movement of contact arm 44 could be so regulated that no movement at all would take place until just before the arm 82 reached the limit of its movement in the direction of the arrow $b$. The position of such a cam is illustrated by the right hand cam on shaft 64 as shown in Fig. 1. A contact controlled by such a cam could be called a reverse contact as it is formed just before or at the moment when the arm 82 reaches its full reverse position.

Applicant has heretofore described a means for causing arm 82 to move automatically to the vertical position when the means connected to it for moving it become broken. The reason for such a mechanism arises from the fact that it is sometimes very desirable to break the normal contact when anything happens to the circuit controller controlling means, thereby indicating the defect by the inoperativeness of the circuit controlled thereby.

The complete mechanism heretofore described will be perceived to contain elements rendering it positive in action; easily adjustable through a very wide range; and of such a nature that the parts will readily remain in an adjusted position. It will be further noticed that although the chamber containing the operating contacts has been rendered water tight, it is still very easy to reach the operating contacts in the water tight chamber for all that is necessary is to raise the outer cover 14 and the contact cover 20, both of which operations are the simplest possible.

Although I have particularly described the construction of one physical embodiment of my invention, and explained the operation and principle thereof nevertheless, I desire to have it understood that the form selected is merely illustrative, but does not exhaust the possible physical embodiments of the idea of means underlying my invention.

What I claim as new and desire to secure by Letters Patent of the United States, is:

1. A circuit controller comprising a fixed contact spring, a movable contact arm arranged to be moved into contact with said spring, a rock lever, means for operatively connecting the rock lever and said contact arm, an operating shaft, a cam secured to said shaft and having a cam face substantially concentric with the axis of said shaft, and two rollers carried by said rock lever and arranged to coöperate with the face of said cam.

2. A circuit controller comprising a supporting panel of insulating material, a movable contact arm supported by said panel, a contact spring secured to said panel in position to be touched by said contact arm, a rock lever, means for operatively connecting said rock lever and said contact arm, an operating shaft, a cam secured to said shaft and having a cam face substantially concentric with the axis of said shaft, and two rollers carried by said rock lever and arranged to coöperate with said face of said cam, said face of said cam being slightly shorter than the distance between said rollers.

3. A circuit controller comprising a fixed contact spring, a movable contact arm arranged to be moved into and out of contact with said spring, a rock lever, means for connecting said rock lever and said contact arm, an operating shaft, a cam secured to said shaft and having a cam face substantially concentric with the axis of said shaft, said cam face being beveled at its ends, and two rollers carried by said rock lever and arranged to coöperate with said cam face, the distance between said rollers being slightly greater than the distance between the beveled ends of said cam face of said cam.

4. A circuit controller comprising a fixed contact spring, a movable contact arm arranged to contact with said spring, a rock lever, means for operatively connecting said rock lever and said contact arm, an operating shaft, a cam secured to said shaft and having two separate cam faces substantially concentric with the axis of said shaft and arranged on opposite sides thereof, and two rollers carried by said rock lever and arranged to coöperate with the face of said cam.

5. A circuit controller comprising a vertically disposed supporting panel of insulating material, a movable contact arm supported by said panel and disposed vertically, a contact spring secured to said panel in position to be touched by said contact arm, a rock lever mounted to oscillate on a horizontal axis adjacent to said panel, means for operatively connecting said rock lever and said contact arm, a cam adjustably secured to said shaft and having a cam face substantially concentric to the axis thereof, and two rollers carried by said rock lever and arranged to coöperate with said cam face.

6. A circuit controller comprising a supporting panel of insulating material, a movable contact arm supported by said panel, a contact spring secured to said panel in position to be touched by said contact arm, a rock lever, means for operatively connecting said rock lever and said contact arm, an operating shaft, a cam secured to said shaft and having two separate cam faces, and two rollers carried by said rock lever and arranged to coöperate with the respective faces of said cam.

7. A circuit controller comprising a movable contact arm, a fixed contact spring arranged in position to be touched by said contact arm, a rock lever, a link connecting said contact arm and one end of said rock lever, an operating shaft, a cam secured to said shaft and having a cam face substantially concentric with the axis of said shaft, said cam face being beveled at its ends, and two rollers carried by said rock lever and arranged to coöperate with said cam face.

8. A circuit controller comprising a supporting panel of insulating material, a resilient contact arm fixed at one end to said panel, contact springs secured to said panel and arranged on opposite sides of said contact arm in position to be touched thereby, a rock lever mounted for oscillation adjacent to said panel, a link pivotally connected at its ends to said rock lever and to said contact arm respectively, an operating shaft, a cam secured to said shaft and having two separate cam faces substantially concentric with the said operating shaft and arranged on opposite sides thereof, said cam faces being beveled at their ends, and two rollers carried by said rock lever and arranged to coöperate with the faces of said cam, the distance between said rollers being substantially the same as the distance between the corresponding beveled ends of said cam faces.

9. A circuit controller comprising a supporting panel of insulating material, a resilient contact arm fixed at one end to said panel, contact springs secured to said panel and arranged to coöperate with said contact arm, a rock lever mounted for oscillation adjacent to said panel, means connecting said rock lever and said contact arm, an operating shaft, a cam journaled on said shaft and having two walls connected by arcuate cam faces substantially concentric with said shaft, means supported by the walls of said cam for adjusting said cam on said shaft and for holding it in its different adjusted positions, the ends of said cam faces being beveled and two rollers carried by said rock lever and arranged in position to be engaged by said cam faces.

10. A circuit controller comprising a supporting panel of insulating material, a movable contact arm supported by said panel, contact springs secured to said panel and arranged on opposite sides thereof in position to be touched thereby, a rock lever mounted for oscillation adjacent to said panel, a link connecting said contact arm and said rock lever, an operating shaft, a cam journaled on said shaft, a member fixed to said shaft and adjustably connected to said cam, said cam having a cam face substantially concentric with the axis of said shaft and beveled at its ends, and two rollers revolubly mounted on said rock lever and arranged to coöperate with said cam face, the distance between said rollers being substantially the same as the distance between the beveled ends of said cam face.

WILLIAM S. HENRY.

Witnesses:
  LILLIAN L. PHILLIPS,
  LYNN CURRY.